3,067,905
WEATHERPROOF BATTERY BOX
Yale W. Ehret, Elkhart, Ind., assignor to The Adlake Company, a corporation of Illinois
Filed Dec. 2, 1960, Ser. No. 73,396
2 Claims. (Cl. 220—24)

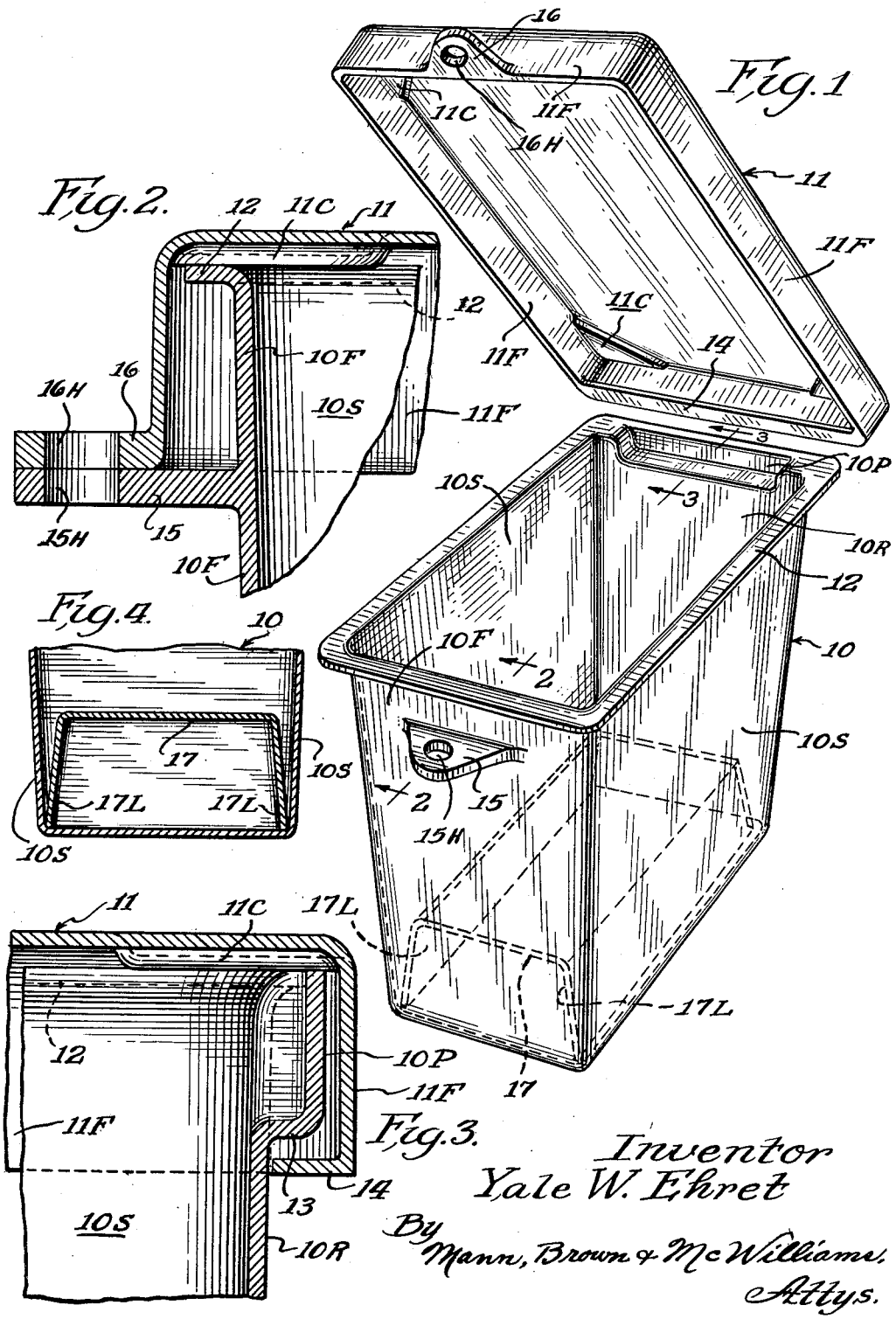

This invention relates to a weatherproof battery box of the type used in railway signaling applications, and more particularly, is concerned with a battery box construction which is particularly suitable for in-the-ground installations.

In-the-ground installations impose the most severe weathering and corrosion problems, and it is the principal object of this invention to provide a battery box that is composed entirely of a moldable, weatherproof and corrosion resistant material.

Battery boxes normally consist of a main housing in which a battery is mounted and a cover for closing the top of the housing, and it is important that the cover be arranged to be fixedly secured across the top by means of a lock, and yet be conveniently removable. To achieve this corresponding ends of the housing and cover are provided with integrally formed cooperatively hingingly interengageable surfaces and their corresponding opposite ends are provided with integrally formed cooperating lock pads or ears.

Another object of the invention is the provision in a battery box of an insert composed entirely of weatherproof and corrosion resistant material and mounted within the bottom of the housing to present a sturdy support shelf for the battery.

Other and further objects of the present invention will be apparent from the following description and claims, and are illustrated in the accompanying drawings, which, by way of illustration, show a preferred embodiment of the present invention and the principles thereof, and what is now considered to be the best mode in which to apply these principles. Other embodiments of the invention embodying the same or equivalent principles may be used and structural changes may be made as desired by those skilled in the art without departing from the invention.

In the drawings:

FIG. 1 is a perspective view illustrating the cover and housing elements of the battery box of this invention;

FIG. 2 is an enlarged fragmentary sectional view, taken on a line indicated at 2—2 of FIG. 1, and illustrating the cover in its secured position on the housing to disclose the front edge construction and the mating lock pads at the front of the housing and cover element;

FIG. 3 is an enlarged fragmentary sectional view, taken on a line indicated at 3—3 of FIG. 1, and illustrating the cover in its secured position on the housing to disclose the rear edge hinging construction of the housing and cover elements; and FIG. 4 is a transverse sectional view through the lower portion of the box to illustrate a novel support shelf mounted therein.

Referring now to the drawings, and particularly to FIG. 1 thereof, the weatherproof battery box of this invention is illustrated for purposes of disclosure as comprising a generally box-shaped housing 10 having an open top of generally rectangular plan configuration, and a cover 11 for bridging the top of the housing and also being of generally rectangular plan configuration corresponding to and slightly larger than the top of the housing.

Both the cover and the housing are composed entirely of glass fiber reinforced plastic material, and they may be constructed by the familiar hand lay-up method in which case it is preferred to apply mats of glass fiber to a suitably shaped female mold member, impregnate the reinforcement mats with a catalyzed resin of any suitable formulation and then cure the material at room temperature and/or at elevated temperatures if so desired. It is also contemplated that machine molding techniques may be employed in lieu of the hand lay-up process described above.

The housing has a set of four generally flat walls bordering and defining a battery chamber with the front and rear walls 10F and 10R, respectively, being of corresponding size and being substantially shorter than the opposed side walls 10S for defining an elongated generally rectangular battery chamber. The housing 10 has an outwardly projecting rim 12 along the upper edge of its two side walls 10S and its front wall 10F, and is provided with an outwardly offset portion 10P across the upper end of its rear wall to provide a downwardly facing, horizontally extending external abutment shoulder 13 (FIG. 4). Preferably, the outwardly offset portion on the rear wall projects outwardly to approximately the same extent as the projecting rim 12 which is provided around the remainder of the top of the housing.

The cover 11 has an integrally formed edge flange 11F depending vertically from along its four side edges with the edge flange portion on the rear of the cover terminating in a horizontally inwardly extending ledge 14 that is spaced beneath the cover by a distance slightly greater than the distance by which the abutment shoulder 13 is spaced beneath the rim 12 of the housing. In addition, the opposite extremities of the ledge are merged integrally to the adjacent ends of the side flanges to strengthen and rigidify the ledge structure.

As is apparent from a consideration of FIGS 2 and 3, the cover extends slightly outwardly of the rim 12 at the top end of the housing to provide lateral clearance between the housing rim and the cover flange 11F. In addition, the cover flange projects downwardly of the rim by a substantial distance in order that it may function as a shield for excluding dirt, dust and other foreign material from the battery chamber.

A lock pad 15 is integrally fixed to the front wall of the housing at a point centrally thereof and spaced beneath the housing rim a distance slightly greater than the ledge 14 and preferably arranged in a plane defined by the lower edge of the cover flange. A mating lock pad 16 is affixed to the front portion of the cover flange 11F centrally and along its lower edge to overlie and seat upon the lock pad of the housing. Each lock pad is formed with a hole (15H and 16H, respectively) arranged for mutual registry when the cover 11 is in its installed position across the top of the housing 10.

To mount the cover on the housing it is positioned approximately as illustrated in FIG. 1 to permit the ledge 14 along the rear flange 11F of the cover to engage beneath the external abutment shoulder 13 that is provided across the upper end of the rear wall 10R of the housing. This ledge and abutment shoulder are engageable to function as a hinge for pivotally guiding the cover into its final position wherein its lock pad 16 seats upon the lock pad 15 of the housing. Any suitable lock may then be secured through the registering holes in the lock pads to fix the cover in this position. The particular formation and location of the ledge and shoulder arrangement incorporates both a hinging and an interlocking function in a box wherein the cover and housing elements are fabricated entirely of a glass fiber reinforced plastic material and this avoids the necessity of separate hinge plates or other metallic attachments. This construction is resistant to weathering and corrosion effects and this importantly increases the useful life of the battery box, particularly in those instances wherein it is subjected to extreme climatic conditions and corrosive surrounding such as would severely damage metal parts.

It is customary in battery boxes for railway signaling applications that means be provided for circulating air to the battery. In the arrangement illustrated herein for purposes of disclosure, the corner regions 11C of the cover are offset downwardly to seat upon the housing rim 12 and space the main body of the cover slightly thereabove. Alternative ventilating arrangements are also contemplated. For example, the lock pads 15 and 16 may be located so that the cover is supported in elevated relation above the housing rim, and this is true of the lock pad arrangement illustrated herein. Alternatively, ripples or undulations may be formed along the top edge of the housing to provide a multiplicity of vent passages for air circulation.

To support the battery within the box in an elevated relation to the bottom of the box an insert shelf 17 of generally channel-shaped cross sectional configuration, as best seen in FIG. 4, and also of fiber glass reinforced plastic material, is disposed within the bottom of the box to present a sturdy, long-lived and rigid support structure. The channel shape occupies minimum volume and the arrangement of the insert with the support legs 17L fitted snugly against the side walls 10S of the housing permits an insert of glass fiber reinforced plastic material to withstand the relatively severe loads involved.

In a preferred constructional embodiment the interior dimensions of the housing are 13¼" by 8¾" at the bottom and 14½" by 8¾" at the top, the shelf height is 3¾" and the overall lengthwise dimension of the cover is 16⅜". This construction of glass fiber reinforced plastic material can withstand temperatures from −65° F. to +220° F.

It may be noted that the battery box may conveniently be mounted between adjacent ties in a railway bed, the box being buried in the ground to dispose the box with its longer sides extending adjacent and parallel to the ties and to locate its cover approximately at the elevation of the ties. The arrangement of the ledge 14 and abutment shoulder 13 at the narrow rear face of the box and the arrangement of the lock pads 15 and 16 at the narrow front face of the box avoids any possibility of conflict between these movable parts and the ties. Moreover, the cover is hinged to the housing to swing about a long radius and this results in a more desirable hinging action.

It should be understood that the description of the preferred form of the invention is for the purpose of complying with section 112, Title 35, of the United States Code, and that the appended claims should be construed as broadly as the prior art will permit.

I claim:

1. A weatherproof battery box for railway signaling application and comprising a rigid one piece generally box-shaped housing composed entirely of glass fiber reinforced plastic material and having a set of four upstanding surrounding walls arranged in opposed pairs with the walls of one pair being substantially longer than the walls of the other pair, said walls bordering and defining a battery chamber that has an open top of generally rectangular plan configuration, a rigid one piece cover for the top of said housing and being of a rectangular plan configuration corresponding to and slightly larger than the top of said housing, said housing having an outwardly projecting rim along its two longer walls and one of its shorter walls and having its other shorter wall offset outwardly at a vertically intermediate location across and adjacent to its upper end to provide a downwardly facing, horizontally extending external abutment shoulder spaced beneath the plane of said rim, said cover being composed entirely of glass fiber reinforced plastic material and having an integrally formed edge flange depending vertically from four sides thereof with the edge flange on a shorter side thereof, that corresponds to and cooperates with said other shorter wall of said housing, terminating in a horizontally inwardly extending ledge that is spaced beneath said cover by a distance slightly greater than the distance by which said abutment shoulder is spaced beneath the rim of said housing, said cover being mounted to said housing by engaging said ledge underneath said abutment shoulder to establish hinge-like interengagement and by thereafter swinging said cover into flush relation over said top with the edge flange on said covering projecting downwardly of the rim on said housing, an integral first locking ear rigid with the projecting laterally outwardly from said one shorter wall of said housing and an integral second locking ear rigid with and projecting laterally outwardly from said cover edge flange on a side thereof that corresponds to and cooperates with said one shorter wall of said housing, with said second locking ear overlying and abutting said first locking ear when said cover is in fully mounted position on said housing, said ears having registering openings for the reception of a common locking member which, in conjunction with the interengagement between said ledge and abutment shoulder, secures said cover against removal.

2. A weatherproof battery box for railway signaling application and comprising a rigid one piece generally box-shaped housing composed entirely of glass fiber reinforced plastic material and having a set of four upstanding surrounding walls bordering and defining a battery chamber that has an open top of generally rectangular plan configuration, a rigid one piece cover for the top of said housing and being of a rectangular plan configuration corresponding to and slightly larger than the top of said housing, said housing having an outwardly projecting rim along three of said walls and having its fourth wall offset outwardly at a vertically intermediate location across and adjacent to its upper end to provide a downwardly facing, horizontally extending external abutment shoulder spaced beneath the plane of said rim, said cover being composed entirely of glass fiber reinforced plastic material and having an integrally formed edge flange depending vertically from four sides thereof with the edge flange on the side thereof, that corresponds to and cooperates with said fourth wall of said housing, terminating in a horizontally inwardly extending ledge that is spaced beneath said cover by a distance slightly greater than the distance by which said abutment shoulder is spaced beneath the rim of said housing, said cover being mounted to said housing by engaging said ledge underneath said abutment shoulder to establish hinge-like interengagement and by thereafter swinging said cover into flush relation over said top with the edge flange on said cover projecting downwardly of the rim on said housing, and corresponding integral locking ears rigid with and projecting laterally outwardly on corresponding external portions of said housing and said cover for interengaging abutment when said cover is in fully mounted position on said housing, said ears having registering openings for the reception of a common locking member which, in conjunction with the interengagement between said ledge and said abutment shoulder secures said cover against removal.

References Cited in the file of this patent

UNITED STATES PATENTS

| 461,195 | Dillon | Oct. 13, 1891 |
| 2,036,876 | Kraft | Apr. 7, 1936 |
| 2,523,796 | Weeks | Sept. 26, 1950 |
| 2,897,993 | Uecker | Aug. 4, 1959 |
| 2,936,094 | Smith | May 10, 1960 |

FOREIGN PATENTS

| 254,498 | Great Britain | July 8, 1926 |